United States Patent
Schmidt

(10) Patent No.: US 8,700,077 B2
(45) Date of Patent: Apr. 15, 2014

(54) SYSTEM AND METHOD FOR DETERMINING NOISE FLOOR IN A WIRELESS COMMUNICATIONS ENVIRONMENT

(75) Inventor: Jeffrey C. Schmidt, Orlando, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 262 days.

(21) Appl. No.: 13/351,807

(22) Filed: Jan. 17, 2012

(65) Prior Publication Data

US 2013/0184022 A1 Jul. 18, 2013

(51) Int. Cl.
*H04W 16/18* (2009.01)
*H04B 15/00* (2006.01)

(52) U.S. Cl.
USPC ....................................................... 455/509

(58) Field of Classification Search
CPC .. H04B 7/0408; H04B 7/0632; H04B 1/1081; H04B 7/0619
See application file for complete search history.

(56) References Cited

U.S. PATENT DOCUMENTS

| | | | |
|---|---|---|---|
| 6,876,868 B2 * | 4/2005 | Crocker et al. | 455/522 |
| 7,359,718 B2 * | 4/2008 | Tao et al. | 455/456.5 |
| 2002/0029112 A1 | 3/2002 | Conover | |
| 2003/0092379 A1 | 5/2003 | Brothers, Jr. et al. | |
| 2004/0248580 A1 | 12/2004 | Backes et al. | |
| 2006/0019679 A1 | 1/2006 | Rappaport et al. | |
| 2008/0123608 A1 * | 5/2008 | Edge et al. | 370/338 |
| 2008/0221951 A1 | 9/2008 | Stanforth et al. | |
| 2008/0222019 A1 | 9/2008 | Stanforth et al. | |
| 2008/0222021 A1 | 9/2008 | Stanforth et al. | |
| 2009/0046625 A1 | 2/2009 | Diener et al. | |
| 2009/0197627 A1 | 8/2009 | Kuffner et al. | |
| 2010/0087220 A1 * | 4/2010 | Zheng et al. | 455/522 |
| 2010/0105315 A1 | 4/2010 | Albrett | |
| 2011/0077042 A1 | 3/2011 | Stanforth et al. | |
| 2011/0163917 A1 | 7/2011 | Lundgren et al. | |
| 2012/0163338 A1 * | 6/2012 | Zhang et al. | 370/331 |

OTHER PUBLICATIONS

"Digital Dividend: Cognitive Access, Consultation on License-Exempting Cognitive Devices using Interleaved Spectrum", Ofcom, Publication Date: Feb. 16, 2009.
By the Commission, "Second Report and Order, Order on Reconsideration, and Second Further Notice of Proposed Rulemaking", Federal Communications Commission, 2004, FCC 04-167, pp. 1-180.
FCC 08-260, Second Report and Order and Memorandum Opinion and Order, Adopted Nov. 4, 2008 and Released Nov. 14, 2008.

(Continued)

*Primary Examiner* — Andrew Wendell
*Assistant Examiner* — Maryam Soltanzadeh
(74) *Attorney, Agent, or Firm* — Renner, Otto, Boisselle & Sklar, LLP

(57) ABSTRACT

An electronic device includes communications circuitry configured to communicate with an assistance server. The electronic device has an antenna assembly having antenna configuration parameters including a gain profile and a direction. The electronic device transmits a noise floor data request to the assistance server, the noise floor data request including a location of the electronic device, an indication of the gain profile and the direction. The electronic device receives a noise floor value from the assistance server for at least one wireless communications channel, the noise floor value determined to account for the location of the electronic device, the gain profile and the direction of the antenna assembly.

18 Claims, 4 Drawing Sheets

(56) References Cited

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

Radio Spectrum Management, Module 5 of ICT Regulation Toolkit, ITU, 2007.

Prabhu, Krish et al., "Time for Action" Genuine Ideas, 2002, [retrieved online Feb. 1, 2008], <http://www.genuineideas.com/ArticlesIndex/TimeForAction.htm>.

U.S. Spectrum Management Policy: Agenda for the Future, 1991.

47 C.F.R. 15.713.

Jones, Steven K. et al., "Initial Evaluation of the Performance of Prototype TV-Band White Space Devices", (2007), OET Report, FCC/OET 07-TR-1006.

International Search Report and Written Opinion from corresponding International Application No. PCT/US13/20192, mailed on Mar. 19, 2013.

* cited by examiner

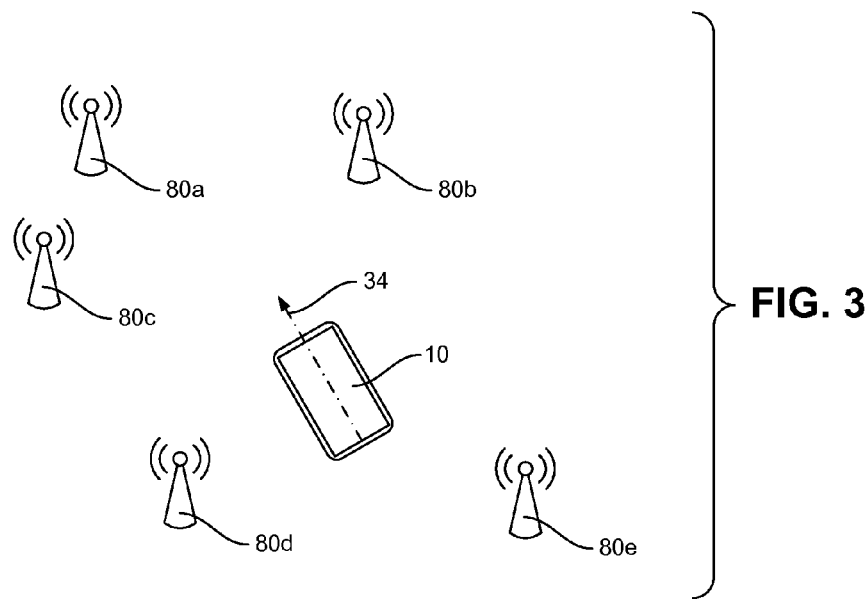
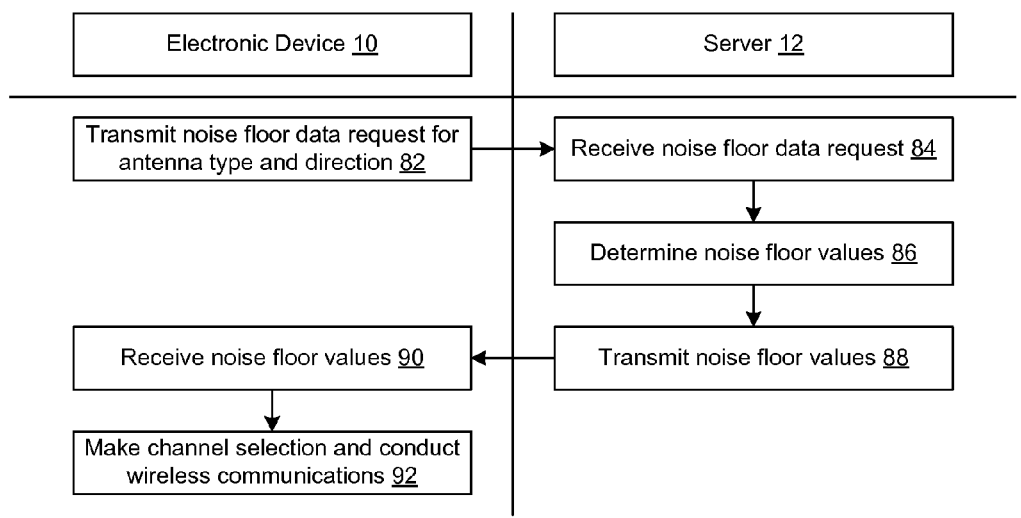

SYSTEM AND METHOD FOR DETERMINING NOISE FLOOR IN A WIRELESS COMMUNICATIONS ENVIRONMENT

TECHNICAL FIELD OF THE INVENTION

The technology of the present disclosure relates generally to wireless communications and, more particularly, to a system and method for determining noise floor in a wireless communications environment with a portable electronic device and a support server.

BACKGROUND

Wireless networks and systems are becoming increasingly popular. But wireless communications are constrained due to a lack of available, interference free spectrum that may be used for reliable communications within a geographic area. Knowing the amount of potential interference on various channels at specific locations and for specific antenna configurations of an electronic device may be of assistance in planning wireless communications use.

BRIEF DESCRIPTION OF THE DRAWINGS

FIG. 3 is a representative operational environment for the electronic device;

FIG. 4 is a flow diagram representing an exemplary method of determining noise floor.

DETAILED DESCRIPTION OF EMBODIMENTS

Figure 1:
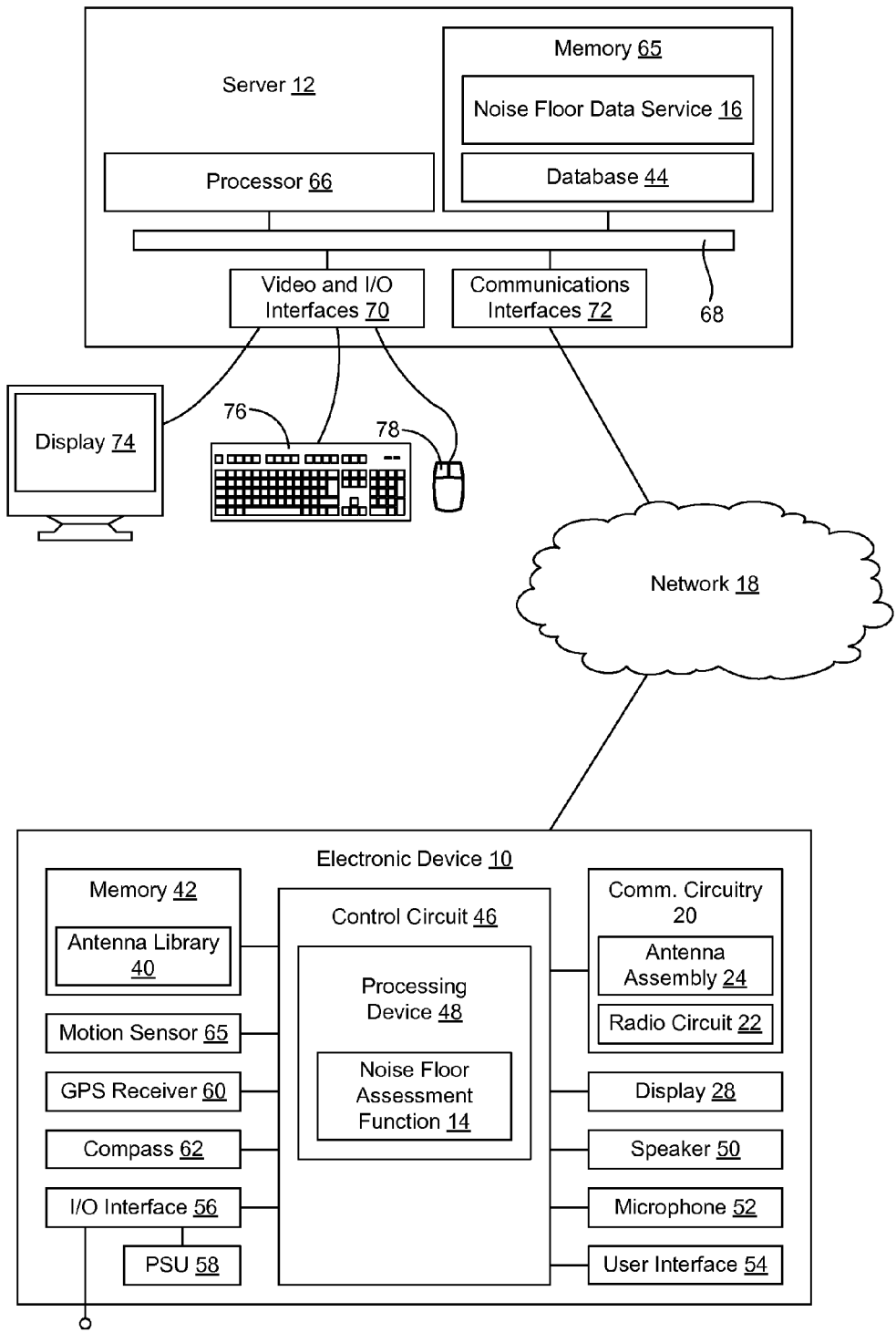
FIG. 1 is a schematic view of an exemplary system for determining noise floor at a location of an electronic device.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

A. Introduction

Methods and systems for determining noise floor at the location of an electronic device (alternatively referred to as a radio device) with the assistance of a server will be described. In one embodiment, the electronic device is a network planning tool to assist a user in deploying wireless devices, such as network access points that provide wireless connectivity for client electronic devices. Information from the planning tool may be of assistance in determining where to place the wireless devices, orientation of the wireless devices, antenna configuration of the wireless devices, and/or which channel to use for wireless communications.

In other embodiments, the electronic device is a device that engages in wireless communications and uses the noise floor information in making one or more configuration determinations, such as a channel selection or an antenna configuration selection.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties.

As another approach to making spectrum available to many users, some spectrum may be used without a license in a regulated spectrum sharing environment. For example, the FCC has eliminated analog television (TV) broadcasts in favor of digital TV broadcasts. This has freed spectrum channels for use by unlicensed radio systems to offer various services, such as mobile communications and Internet access. In this context, the freed spectrum is commonly referred to as TV white space but other types of white spaces are possible. In the case of TV white space, the white space is comprised of unused TV spectrum between channel 2 and channel 51 (corresponding to 54 MHz to 698 MHz).

To avoid interference with digital TV broadcasts and other incumbent systems, such as wireless microphone systems, radios that use the TV white space are required to request and receive a channel map of available channels that may be used for the communications activity of the radio system. Current regulations require these radio systems to request a channel list every twenty-four hours. Also, for portable or mobile radios, if the radio moves into a new location, a new request must be made. Other regulations on the radios are present, such as transmitted power limits for different types of radios.

Although various regulatory agencies have identified parameters for the use of unlicensed and/or shared spectrum, such as TV white spaces, there is room for improvement in the manner in which radio devices are informed of available spectrum and make channel selection decisions. In one embodiment, the below-described server provides channel maps (also referred to as channel lists) of available spectrum to radio devices based on predicted noise floor to improve use of spectrum resources. The noise floor for each available channel is indicative of the quality of the channel for use by the radio device for which the channel map was generated. For instance, a channel may be unoccupied by a protected device and, therefore, available for use. But not all available channels have equal amounts of noise. Channels with a relatively high amount of noise, referred to as "grey spaces," may not adequately support the wireless communications operations of some radio devices.

The noise floor for each channel may depend on characteristics of the device making the channel list request. For example, antenna configuration and orientation of the electronic device may affect noise floor results.

For purposes of description, the electronic device will be described in the context where the electronic device is a device that requests channel lists to access spectrum used for wireless communications. An exemplary device of this nature is a TV white space band device (TVBD). It will be appreciated, however, that the electronic device may be another type of device, such as the above-mentioned network planning tool, a mobile telephone, a computer (e.g., a laptop computer or a tablet computer), a mobile WiFi hotspot device, a media player, a gaming device, a personal digital assistant (PDA), an electronic book reader, etc. The electronic device may be fixed in location, such as a wireless access point, or may be portable, such as some of the above-mentioned devices. It will be understood that each described electronic device may be a radio system that includes one, or more than one, radio device that is capable of wireless communications. In the case of a radio system that includes plural devices capable of wireless communications, a supervising device may request a channel list for the entire radio system and select an operational channel, and each device in the system will be controlled to operate in accordance with the selected channel.

In the context of white spaces, the white spaces may be television white spaces or some other form of useable spectrum that is interleaved with spectrum used by incumbent, licensed or existing users, even if that spectrum is not referred to as white space by a governing regulatory entity. It will be appreciated, however, that the techniques described in this document may apply to other situations, including situations that do not involve the selection of an operational channel.

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to dumb and/or cognitive radio devices. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable environment.

In embodiments in this disclosure, the electronic device makes noise floor determinations in conjunction with a server. The server may undertake other functions, such as responding to white space channel list requests with appropriate channel lists. Therefore, in some embodiments, the server may be considered a central white space registration system.

B. System Architecture

Referring initially to FIG. 1, shown is a system that includes an electronic device 10 and a server 12. The electronic device 10 is typically, but not necessarily, portable and has wireless communication capabilities. The server 12 communicates with the electronic device 10, as well as other devices to which the server 12 provides services. The electronic device 10 may include a noise floor assessment function 14 and the server 12 may include a noise floor data service 16. The noise floor assessment function 14 and noise floor data service 16 may cooperate with each other to assist the electronic device 10 assess channel quality for various combinations of location, orientation, and antenna configuration. The electronic device 10 and the server 12 may communication through a network 18, such as the Internet.

Each of the noise floor assessment function 14 and the noise floor data service 16 may be embodied as a set of executable instructions (e.g., code, programs, or software) that are respectively resident in and executed by the electronic device 10 and the server 12. The functions 14 and 16 each may be one or more programs that are stored on respective non-transitory computer readable mediums, such as one or more memory devices (e.g., an electronic memory, a magnetic memory, or an optical memory). In the following description, ordered logical flows for the functionality of the noise floor assessment function 14 and the noise floor data service 16 are described. It will be appreciated that the logical progression may be implemented in an appropriate manner, such as an object-oriented manner or a state-driven manner.

The electronic device 10 includes communications circuitry 20. In the illustrated exemplary embodiment, as part of the communications circuitry 20, the electronic device 10 includes a radio circuit 22 and an antenna assembly 24. The communications circuitry 20 may be used to carry out various wireless communications functions, including communicating with the server 12. In the exemplary case where the electronic device 10 is a mobile telephone, the communications functions may include engaging in voice or video calls, and sending or receiving messages (e.g., email messages, text messages, multimedia messages, instant messages, etc.), accessing the Internet, etc. The illustrated components may represent one or more than one radio transceiver to enable the electronic device 10 to be able to communicate over various types of network connections and/or protocols. For instance, the electronic device 10 may be configured to communication with a cellular communications network. Exemplary cellular communications network types include, by are not limited to, networks operating in accordance with global system for mobile communications (GSM), enhanced data rates for GSM evolution (EDGE), code division multiple access (CDMA), wideband CDMA (WCDMA), integrated services digital broadcasting (ISDB), high speed packet access (HSPA), or any other appropriate standard or advanced versions of these standards. The cellular communications networks may be compatible with 3G and/or 4G protocols. Additionally, the electronic device 10 also may be configured to communicate with other types of networks, such as a packet-switched network. An exemplary packet-switched network includes a network configured in accordance with IEEE 802.11 (e.g., IEEE 802.11a, IEEE 802.11b, or IEEE 802.11n), each of which are commonly referred to as WiFi. Another exemplary packet-switched network includes a network configured in accordance with IEEE 802.16 (commonly referred to as WiMAX).

Figure 2:
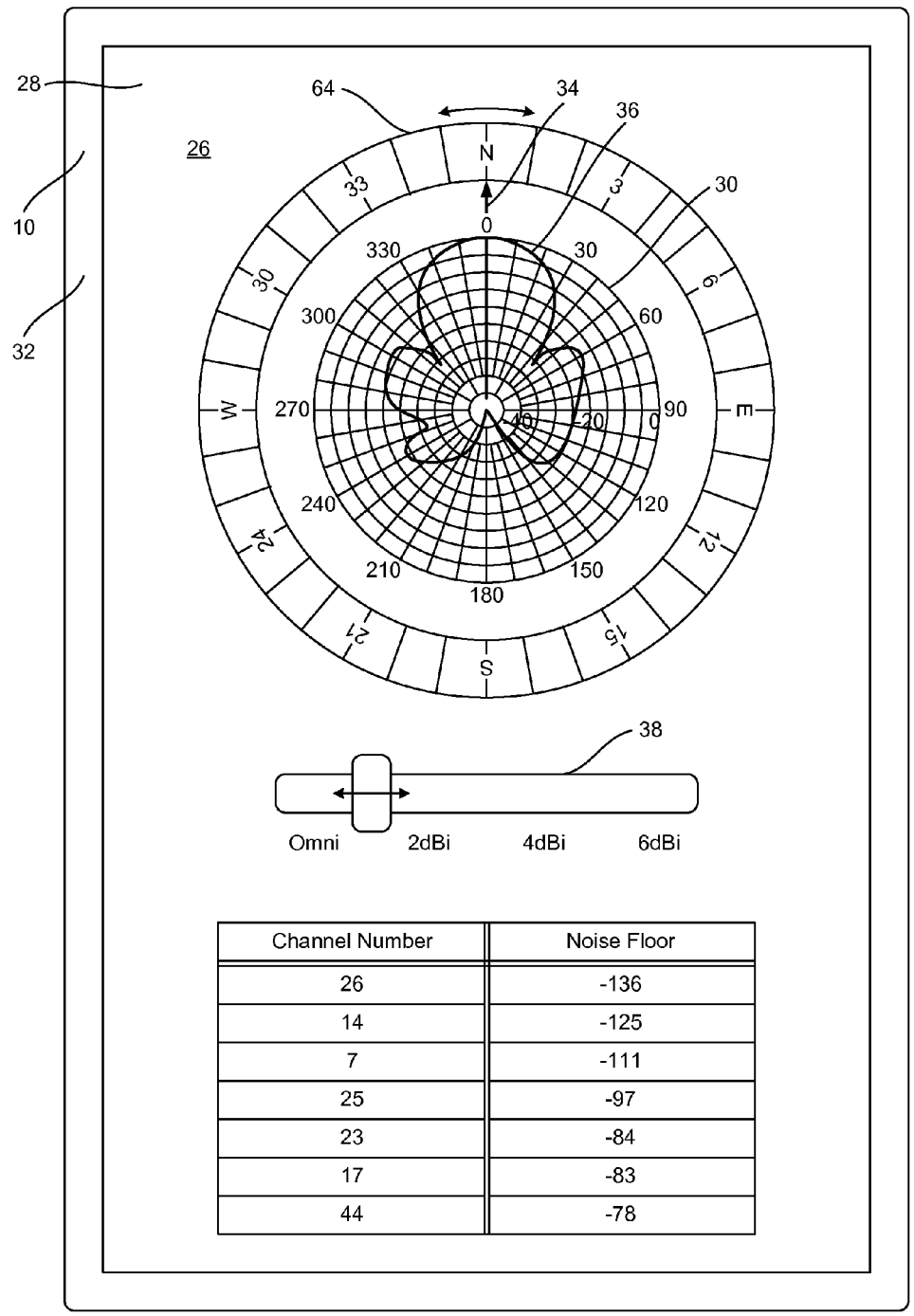
FIG. 2 is an exemplary graphical user interface displayed by the electronic device.

With additional reference to FIG. 2, the gain profile of the antenna assembly 24 may be known. In the embodiment where the electronic device 10 uses the antenna 24 for wireless communications and makes noise floor determinations to improve the wireless communications, the gain profile is the gain profile for a known configuration of the antenna assembly 24. In embodiments where the electronic device 10 is a network planning tool for assisting a network developer in deploying a separate radio device, the gain profile refers to a gain profile of the radio device for which planning is being made. That is, an actual gain profile of any antenna assembly of the network planning tool may not be the same as the gain profile used for noise floor determination.

FIG. 2 represents an exemplary graphical user interface (GUI) 26 that is displayed on a display 28 of the electronic device 10. The exemplary display 28 includes touch-screen functionality. In one embodiment, the GUI 26 displays a polar plot 30 of the gain of the antenna assembly 24. The gain is measured with respect to a bore sight of the antenna assembly 24, which is typically fixed relative to a housing 32 of the electronic device 10. In the illustrated embodiment, the bore sight is aligned with a longitudinal axis (denoted by arrow 34) of the electronic device 10. Regardless of the relationship of the bore sight of the antenna assembly 24 and the electronic device 10, the bore sight will be considered always aligned with a known point of the antenna gain profile such as the zero angle of the profile. The gain may be represented by curve 36 on the polar plot 30. Again, in the embodiment where the antenna assembly 24 is part of the electronic device 10 that determines noise floor, these characteristics of the antenna assembly 24 relate to the electronic device 10 itself. In the embodiment where the electronic device 10 is a configuration planning tool for another device, then the antenna characteristic information virtually represents actual antenna characteristics of the device for which planning is made.

The antenna assembly 24 may have a fixed gain profile, such as one of an omnidirectional ("omni") antenna, a 2 decibel (dBi) antenna, a 4 dBi antenna, etc. In other embodiments, the gain (or at least the directivity of the antenna) is variable. For example, the antenna assembly 24 may be controlled to have a gain selected from two or more predetermined gains, such as an omni gain, a 2 dBi gain, a 4 dBi gain, etc. In still another embodiment, the antenna assembly 24 may be controlled to customize the gain. In one embodiment of customizing the gain, the gain may be variably selected among two or more predetermined gains (e.g., an omni gain, a 2 dBi gain, a 4 dBi gain, etc.) or points between the predetermined gains. In the embodiment of FIG. 2, variably selecting the gain in this manner may be achieved using a slider tool 38. In another embodiment of customizing the gain, the gain may be specified by the user. In the embodiment of FIG. 2, specifying the gain in this manner may be achieved by dragging portions of the curve 36 into a desired gain configuration.

Each gain setting of the antenna assembly 24 is associated with a corresponding physical configuration of the antenna assembly 24. The configuration of the antenna assembly 24 is adjusted using configuration circuitry of the antenna assembly 24, such as a MEMS switching array. In one embodiment, the electronic device 10 stores an antenna library 40 in a memory 42. The antenna library 40 contains data regarding each of plural antenna configurations. The data for each configuration may include, for example, configuration data to assist in appropriately setting the configuration circuitry and gain information. In one embodiment, the gain information for each antenna configuration of the electronic device 10 also is stored by the server 12 in a database 44. And, each antenna configuration the antenna library 40 and the database 44 may be associated with a corresponding antenna configuration identifier (e.g., value). As will be described below, storing antenna data for the electronic device 10 in the server 12 may simplify noise floor information requests transmitted by the electronic device 10 to the server 12. For instance, as part of the request, the electronic device 10 may identify a relevant antenna configuration value from the antenna library 40 rather than transmit an entire gain profile since gain profiles for various antenna configurations of the electronic device 10 are already known by the server 12. Additional information about the antenna assembly 24 may be known and stored in the library 40 and/or in the database 44. Another exemplary item of information may be antenna polarization.

Overall functionality of the electronic device 10 may be controlled by a control circuit 46 that includes a processing device 48. The processing device 48 may execute code stored in a memory (not shown) within the control circuit 48 and/or in a separate (e.g., the memory 42) in order to carry out the operations of the electronic device 10. For instance, the processing device 48 may be used to execute the noise floor assessment function 14. The memory 42 may be, for example, one or more of a buffer, a flash memory, a hard drive, a removable media, a volatile memory, a non-volatile memory, a random access memory (RAM), or other suitable device. In a typical arrangement, the memory 42 may include a non-volatile memory for long term data storage and a volatile memory that functions as system memory for the control circuit 46. The memory 42 may exchange data with the control circuit 46 over a data bus. Accompanying control lines and an address bus between the memory 42 and the control circuit 46 also may be present.

The display 28 may be used to display visual information to a user. Also, the electronic device 10 may include a speaker 50 and a microphone 52 to allow the user to carry out voice conversations. One or more user interfaces 54, such as a keypad and/or a touch-sensitive input associated with the display 28, may be present to provide for a variety of user input operations.

The electronic device 10 may further include one or more input/output (I/O) interface(s) 56. The I/O interface(s) 56 may include one or more electrical connectors for connecting the electronic device 10 to another device (e.g., a computer) or an accessory (e.g., a personal handsfree (PHF) device) via a cable, and/or for connecting the electronic device 10 to a power supply. Therefore, operating power may be received over the I/O interface(s) 56 and power to charge a battery of a power supply unit (PSU) 58 within the electronic device 10 may be received over the I/O interface(s) 48. The PSU 58 may supply power to operate the electronic device 10 in the absence of an external power source.

A position data receiver, such as a global positioning system (GPS) receiver 60, may be involved in determining the location of the electronic device 10.

A compass 62 may be used to determine the orientation of the electronic device 10 and, more specifically, the direction (e.g., azimuth) of the bore sight of the antenna assembly 24. In one embodiment, the compass direction is displayed on the display 28 as part of the GUI 26. For instance, a virtual compass 64 indicating orientation of the electronic device 10 may be displayed. The virtual compass 64 may be displayed in conjunction with the polar plot 30 of the antenna gain. In the illustrated embodiment, the virtual compass subscribes the polar plot 30 to visually demonstrate the relationship between the displayed gain and orientation of the electronic device 10. As the electronic device 10 moves, the virtual compass 64 may rotate around the polar plot 30. In the illustrated embodiment, the bore sight (arrow 34) points due north. It will be appreciated the azimuth of the antenna assembly 24 will change with changes in orientation of the electronic device 10. Regardless of the visually displayed information, the electronic device 10 is configured to determine the compass direction of the bore sight of the antenna assembly 24 and include this information in noise floor information requests transmitted by the electronic device 10 to the server 12.

One or more motion sensors 65, such as accelerometers, may be used to sense movement of the electronic device 10. The motion sensors 65 may be used to determined inclination of the antenna assembly 24 (e.g., angle of the bore sight of the antenna assembly 24 with respect to horizontal or vertical inclination).

The server 12 may be implemented as a computer-based system that is capable of executing computer applications (e.g., software programs), including the noise floor data service 16. The noise floor data service 16 and the database 44 may be stored on a non-transitory computer readable medium, such as a memory 65. In addition to storing antenna gain information for the electronic device 10, the database 44 may store data about high power transmitters that is used by the noise floor data service 16.

The memory 65 may be a magnetic, optical or electronic storage device (e.g., hard disk, optical disk, flash memory, etc.), and may comprise several devices, including volatile and non-volatile memory components. Accordingly, the memory 65 may include, for example, random access memory (RAM) for acting as system memory, read-only memory (ROM), hard disks, optical disks (e.g., CDs and DVDs), tapes, flash devices and/or other memory components, plus associated drives, players and/or readers for the memory devices.

To execute the noise floor data service 16, the server 12 may include one or more processors 66 used to execute instructions that carry out logic routines. The processor 66 and the memory 65 may be coupled using a local interface 68. The local interface 68 may be, for example, a data bus with accompanying control bus, a network, or other subsystem.

The server 12 may have various input/output (I/O) interfaces 70 as well as one or more communications interfaces 72. The interfaces 70 may be used to operatively couple the server 12 to various peripherals, such as a display 74, a keyboard 76, a mouse 78, etc. The communications interface 72 may include for example, a modem and/or a network interface card. The communications interface 72 may enable the server 12 to send and receive data signals, voice signals, video signals, and the like to and from other computing devices via an external network. In particular, the communications interface 72 may connect the server 12 to the network 18.

In one embodiment, the server 12 may be configured to host the below-described services for the electronic device 10. In some embodiments, the services may include spectrum management functions, such as providing channel lists to qualified radio devices upon registration and/or request of the radio devices so as to allow the radio devices to make use of spectrum for wireless communications. Also, while the providing of services may be fully automated, the server 12 may host an Internet-style website for the various corresponding parties to conduct initial enrollment with the server 12, conduct manual registration if needed, access various tools and reports supplied by the server 12, and so forth. For supplying the services, the server 12 may collect spectrum usage information from various sources, including but not limited to public databases, private databases and deployed radio devices (e.g., in the form of spectrum sensing results). The database information may contains information about known spectrum users, such as incumbent spectrum uses (e.g., digital television stations, wireless microphone systems, cable head end systems, etc.), licensed spectrum users, or radio systems that are exempt from seeking channel map information in order to operate.

C. Noise Floor Analysis

Available, interference-free spectrum for supporting wireless communications is a scarce resource and the demand for wireless communications is increasing. The following techniques assist in using spectrum efficiently by facilitating dissimilar radio technologies to co-exist.

With additional reference to FIG. 3, the techniques will be described in an exemplary environment where low-powered unlicensed devices (e.g., the illustrated electronic device 10) and high-powered protected devices 80 (e.g., television transmitters) share a common set of bands. As a more specific example, the low-power devices may be broadband data transceivers (e.g., TVBDs) that operate at about +30 dbm in white spaces that are interleaved with channels used by television transmitters that can operate up to +90 dbm. The high-powered devices 80 operate in respective protected areas. The protected areas are established to reduce interference to the operation of the respective devices 80 by limiting the use of the channel on which the device 80 operates (referred to as the primary channel of the device 80) by other devices in the protected area. In the illustrated example, there are five high-powered devices 80 (identified as 80a through 80e), but there may be more than or fewer than five devices 80 that have an effect on the noise floor at the location of the electronic device 10.

The availability of certain frequencies, or white space channels, is a function of time, channel use, and geographic area. This concept of a shared spectrum ecosystem presents little risk to the operational capability of the high-power devices 80 as the low-power devices tend to not cause interference to reception of the high-power signals and do not engage in co-channel operations within protected areas. But the presence of high-powered transmitters can be very disruptive to operation of the low-power devices. By comparison, the high-power transmitters often broadcast at about one megawatt (MW) and with high-elevation antennas, whereas the low-power devices typically rely on transmitters of about one watt or less and are deployed with lower elevation antennas.

The high-power transmitters operating in VHF and UHF frequencies have a vast reach that affects the noise floor over very large areas (e.g., hundreds of miles) for the low-power devices. The primary channel and out-of-band coverage of high-power transmitters (e.g. TV stations) can be accurately predicted using empirically-derived pass loss models, such as R6602 and Longley Rice. From this information, the noise floor for each available channel in the low-power device's geographic location may be determined so that a channel with a relatively low noise floor may be selected for use. The effect of the noise from the high-powered devices may be further refined using information about the low-power device, such as antenna gain, pattern and azimuth, and noise sensing data. The server 12 may be considered a co-existence manager due to its role in determining noise floor information and providing the information to the electronic device 10 and other radio systems. The information may be updated as conditions change due to movement of devices or variations in channel use.

With additional reference to FIG. 4, illustrated are logical operations to implement a method of determining noise floor carried out by the electronic device 10 and a method of assisting in determining noise floor carried out the server 12. The exemplary methods may be respectively carried out by cooperatively executing an embodiment of the noise floor assessment function 14 and an embodiment of the noise floor data service 16. Thus, the flow diagram may be thought of as depicting steps of one method carried out by the electronic device 10 and another method carried out by the server 12. Although the flow chart shows a specific order of executing functional logic blocks, the order of executing the blocks may be changed relative to the order shown. Also, two or more blocks shown in succession may be executed concurrently or with partial concurrence.

In block 82, the electronic device 10 collects information for a noise floor data request and transmits the noise floor data request to the server 12. Noise floor data requests under several operational scenarios are possible. One scenario is when the electronic device 10 makes noise floor determinations for itself and for a currently used gain profile and antenna direction. In this scenario, the information may include location of the electronic device 10. The location of the electronic device 10 may be ascertained using GPS, although other location determining techniques are possible. The information may further include the configuration of the antenna assembly 24 and the direction (e.g., compass direction) of the bore sight of the antenna assembly 24. The configuration of the antenna assembly 24 may be specified in terms of an appropriate one of the antenna configuration values from the antenna library 40. In circumstances where the antenna configuration is a custom configuration or not known to the server 12, the configuration of the antenna assembly 24 may be specified in terms of the gain profile of the antenna assembly 24 (e.g., a polar plot). The direction of the bore sight of the antenna assembly 24 may be specified as a compass direction. Other information may be provided, such as antenna polarization if not discernable from the antenna configuration value.

Other information in the noise floor data request may include data regarding spectrum use conditions in the location of the electronic device 10 (e.g., sensed noise on one or more channels). For instance, the electronic device 10 may identify the channels on which the electronic device 10 detects (or "sees") transmission activity and corresponding signal strengths. This data represents data of actual broadcasts by other radio systems and may be used to adjust noise floor calculations made by the server 12. Other exemplary feedback may include channel metrics, such as sensed noise on one or more channels and/or packet completion rate on one or more channels.

Another operational scenario is when the electronic device 10 makes noise floor determinations for itself and for an antenna configuration that is different than the current used antenna configuration. Determining noise floor for an antenna configuration that is different than the currently used antenna configuration may be performed to evaluate the different configuration in an attempt to improve communications performance. In this scenario, the information in the noise floor data request may include the location of the electronic device 10 as well as the gain profile and antenna direction for which noise floor information is desired. The gain profile may be specified, for example, as an appropriate one of the antenna configuration values from the antenna library 40 or as the complete gain profile. The direction may be specified as the actual compass direction of the bore sight of the antenna or, if the antenna direction is controllable, specified as an antenna direction for which noise floor information is desired.

Another operational scenario is when the electronic device 10 is a planning tool. In this scenario, the information in the noise floor data request is representative of the potential location and antenna configuration (gain profile and antenna direction) of a separate radio device. The location in the noise floor data request may be the actual location of the electronic device 10 if the electronic device 10 is present in the potential location for the radio device. Alternatively, the planning may take place from a remote location using, for example, a computer as the planning tool. In this case, the location specified in the noise floor data request may be selected from a map or specified using other data entry technique to indicate the potential location of the electronic device 10. Additionally, the gain profile and antenna direction may be represent a potential configuration of the radio device for which planning is made. The gain profile may be specified, for example, as an appropriate one of the antenna configuration values from the antenna library 40 or as the complete gain profile.

In block 84, the noise floor data request is received by the server 12. In block 86, the server 12 processes the noise floor data request to a determine noise floor value for each of various channels according to the information contained in the noise floor data request. The channels for which the noise floor values are determined may be channels requested by the electronic device 10. In other embodiments, the channels may be each channel in a predetermined range of channels (e.g., TVBD channels) that is available for use by the electronic device 10 (e.g., channels that are not protected as being occupied by an incumbent user or for some other reason). In another embodiment, the channels may be each channel in a predetermined range of channels (e.g., TVBD channels) regardless of use protections.

In block 88, the noise floor values that were determined in block 86 are transmitted by the server 12 to the electronic device 10. In the embodiment where the server 12 determines a channel list for the electronic device 10, the noise floor values are transmitted in conjunction with the channel list. In block 90, the noise floor values and, if applicable, the channel list are received by the electronic device 10.

In block 92, the electronic device 10 may select a channel for wireless communications based on the received noise floor values and, if applicable, the channel list containing the identification of available channels. In one embodiment, the electronic device 10 automatically selects the channel without user involvement. The selected channel may be the channel with the lowest noise floor value. In other cases, the selected channel may be selected using the noise floor values as one of several weighted factors in a channel selection function. In other embodiments, the channel selection may be made by the user of the electronic device 10. For instance, as illustrated in FIG. 2, noise floor values by channel may be displayed on the display 28. The user may select a channel by touch selecting the desired channel from the displayed list or by other user input.

New requests for noise floor values may be made at various times, such as periodically or if the electronic device changes location, changes direction, and/or changes antenna assembly 24 configuration. Also, several requests may be made for various antenna configurations to obtain noise floor values that are compared to one another to assist in selecting one of the antenna configurations for conducting wireless communications. Also, depending on the circumstances, various potential alternative locations may be evaluated using corresponding requests.

In one embodiment, the operations of the methods depicted in FIG. 4 are carried out at the command of the user. This embodiment may be used when the electronic device 10 is a network planning tool or in other situations where the user is interested in maximizing operational performance. In another embodiment, the operations of the methods depicted in FIG. 4 are carried out automatically and without involvement of the user of the electronic device 10. Automatic performance of the methods may occur periodically and/or when a significant change to the location of the electronic device 10, the direction of the electronic device 10 and/or the configuration of the antenna assembly 24 is detected. The automatic performance of the methods may occur as a background operation to maintain a relatively high degree of operational performance.

D. Noise Floor Value Determination

Figure 5:
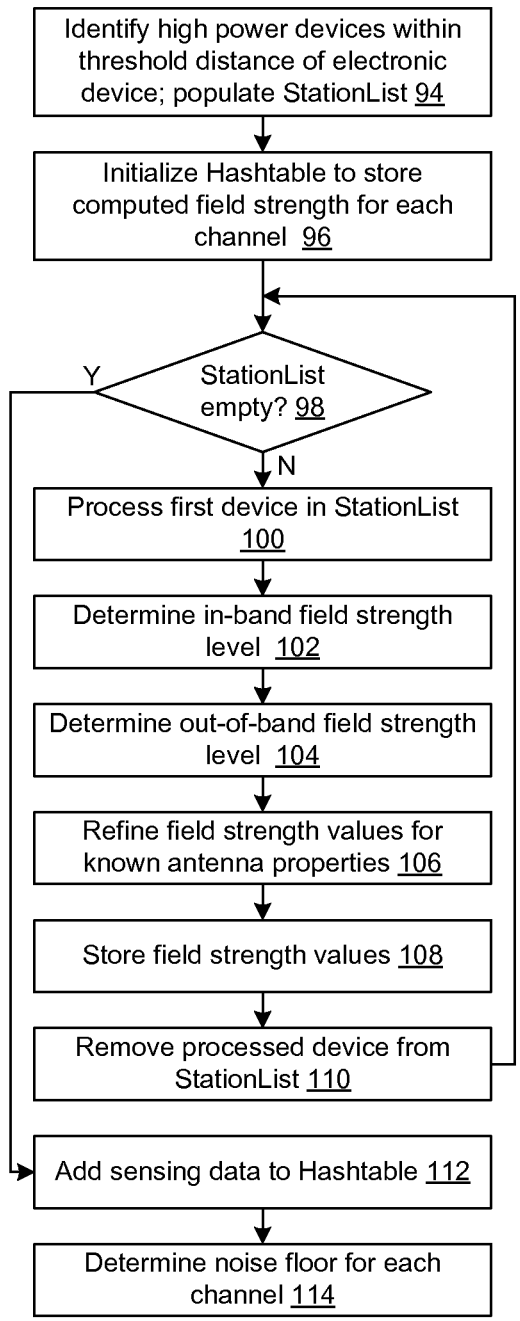
FIG. 5 is a flow diagram representing an exemplary method of support operations carried out by an assistance server that communicates with the electronic device.

With additional reference to FIG. 5, illustrated are exemplary operations carried out by the server 12 to determine the noise floor values as part of block 86 of FIG. 4. As indicated, the determination of noise floor values may be conducted as part of determining a channel list for the electronic device 10 or as part of a separate support operation for the electronic device 10.

In block 94, the server 12 commences the noise floor value determination by identifying each high-power device 80 that is within a predetermined threshold distance from the electronic device 10. The threshold distance is established to identify transmitters that have a reasonable chance of contributing to the noise floor at the location of the electronic device 10. For instance, when calculating noise floor for channels in Orlando Fla., one may want to consider transmitters as far away as Miami Fla. (approximately 200 miles from Orlando) and Atlanta Ga. (approximately 420 miles from Orlando). But there would be little need to consider transmitters in Cleveland Ohio (approximately 1,000 miles from Orlando). In one embodiment, the threshold distance is in the range of about 100 miles to about 800 miles. In another embodiment, the threshold distance is in the range of about 250 miles to about 500 miles. In still another embodiment, the threshold distance is about 300 miles.

Once the high-power devices 80 are identified, the identified high-power devices 80 are added to a list of considered devices, referred to as a StationList. Then, in block 96, a Hashtable is indexed by channel identifier (e.g., channel number). The Hashtable is used to store computed field strength for each channel. In one embodiment, the Hashtable contains all channels in the range of channels managed by the server 12 and the following determinations are made for each of these channels. In another embodiment, the Hashtable contains the channels that are not protected in the location of the requesting electronic device 10 (e.g., the channels that are potentially available for use by the requesting electronic device 10) and the following determinations are made for each of these channels, but not the protected (hence, unavailable) channels. In another embodiment, the Hashtable contains channels that are specified by the electronic device 10 in the noise floor data request. In another embodiment, the Hashtable contains the channels within the tuning capacity of the electronic device 10.

A process loop is carried out to determine the field strength level for each channel based on the contributions from each device 80 in the StationList. In the illustrated embodiment, the process loop starts in block 98 where a determination is made as to whether the StationList is empty. If a negative determination is made in block 98, the logical flow proceeds to block 100. In block 100, processing is commenced for the first device 80 in the StationList.

At block 102, the processing includes determining in-band field strength of the device 80 being processed at the location of the requesting electronic device 10. The band for which the in-band field strength is determined is the operating channel (referred to by the designator "n" or as the primary channel) of the device 80 being processed. The determination is made by computation using a path-loss model. The path-loss model may account for known information, such as one or more of the distance between the location of the device 80 and the location of the electronic device 10, terrain data, and antenna characteristics including but not limited to antenna height for the device 80 and/or antenna height of the electronic device 10. Antenna height of the electronic device 10 may be determined by the electronic device 10 using an altimeter (not shown) or GPS data, and incorporated into the noise floor data request. Alternatively, antenna height of the electronic device 10 may be the ground elevation at the location of the electronic device 10 (e.g., as determined from a terrain database). Alternatively, the antenna height may be assumed to be a predetermined height above ground elevation at the location of the electronic device 10, or a height specified in the request (e.g., if the electronic device 10 is in a building, the user may specify an approximate elevation above ground level or sea level at the current location).

Exemplary path loss models include F-curves, R6602, Raleigh fading, and Longley Rice, although other path loss models may be used. The path loss model may be predetermined, such as by user settings or by default. In other embodiments, a path loss model may be selected for the device 80 being processed in accordance with one or more considerations, such as the type of terrain between the device 80 and the electronic device 10, distance between the device 80 and the electronic device 10, characteristics of the device 80 (e.g., transmitter type, antenna azimuth and/or height, transmit power, etc.), operating channel of the device 80, setting (e.g., urban or rural) of the device 80 and/or the electronic device 10, or other consideration.

At block 104, the processing includes determining out-of-band field strength of the device 80 being processed at the location of the requesting electronic device 10. The out-of-band field strength determination is repeated for a predetermined number of adjacent channels above the operating channel of the device 80 being processed and a predetermined number of adjacent channels below the operation channel of the device 80. If the predetermined number of channels is two, for example, then the out-of-band field strength of the device 80 is determined for n−1, n+1, n−2, and n+2. The predetermined number of channels may be one, two, three, four, or some other number of channels. The out-of-band field strength for each channel may be calculated using the in-band field strength and reducing the in-band field strength by an amount determined in accordance with empirical data and/or regulatory requirements.

In most circumstances, an emission mask for the device 80 may be assumed and the emission mask drives the calculation of the out-of-band field strength for each channel. In one embodiment, the same calculation approach is used for each device 80. But some devices 80 filter out-of-band emissions better than other devices 80. If an emission mask or profile is known for the device 80 being processed, the characteristics of that device may be used in the calculation of out-of-band field strength values.

Refinements to the values calculated in blocks 102 and/or 104 for the known antenna properties for the electronic device 10 may be made at block 106. Exemplary antenna properties considered include, but are not limited to, antenna gain, azimuth (compass direction of the bore sight of the antenna assembly 24), height, inclination, and polarization. The refinements may be made by applying the antenna properties as part of the path loss model used in the foregoing steps or by post-solution alteration of the values determined in the foregoing steps. In the representative illustration of FIG. 3, the electronic device 10 points more in the direction of device 80a than, for example, device 80e. Therefore, device 80a may have a greater contribution to the noise floor for the electronic device 10 than device 80e, even though device 80e may be geographically closer and/or has a larger protected area.

In block 108, the field strength values resulting from block 106 for in-band emissions and out-of-band emissions are stored in the corresponding channel indices of the Hashtable. Next, in block 110, the device 80 that was processed in the preceding blocks of the processing loop is removed from the StationList. The logical flow then returns to block 98 to determine if all devices 80 in the StationList have been processed. If so, a positive determination is made in block 98 and the logic flow proceeds to block 112.

In block 112, if any signal strength sensing data is available from the electronic device 10 or other sources, such as other radio devices that are nearby the electronic device 10, then this sensing data may be added to the Hashtable under the appropriate channel indices. In one embodiment, the sensing data includes detected signals from contributors other than those considered in the prior blocks so as to avoid unintended inflation of the amount of noise on any of the channels.

In block 114, the noise floor value for each channel in the Hashtable is determined. In one embodiment, the noise floor values for each channel is calculated from the field strength values for the corresponding channel index in the Hashtable. The calculation includes converting each field strength value for the channel to power density and summing the resulting power density values. Field strength (also referred to as signal strength) is often expressed in dBuV/m, which is a unit favored by broadcasters since it is easy to measure and allows for easy calculation of the receiver voltage for a standard antenna. Field strength expressed in dBuV/m is converted to power density for free space and expressed in $dBm/m^2$ using the conversion relationship of equation 1.

$$dBm/m^2 = dBuV/m - 115.8 \qquad \text{Eq. 1}$$

The conversion relationship of equation 1 is derived from the power density and field strength equation $P_D = E^2/Z_0$, where $P_D$ is power density in $W/m^2$, E is the root-mean-square (RMS) value of the field in volts/meter, and $Z_0$ is the free space characteristic impedance of 377Ω.

To sum values expressed in dBm (or $dBm/m^2$), the values are converted to mW (or $mW/m^2$) using the relationship of equation 2.

$$mW = 10^{(dBm/10)} \qquad \text{Eq. 2}$$

Values expressed in mW may be added and, if desired, converted back to dBm (or $dBm/m^2$) using the relationship of equation 3.

$$dBm = 10 * \log_{10}(mW) \qquad \text{Eq. 3}$$

The noise floor values resulting from block 114 are the values transmitted to the electronic device 10 in block 88 (FIG. 4).

D(i). First Prophetic Example

This example describes the noise contributions from a protected radio device 80 in what is typically the worst case scenario for TV whitespace use. For in-band noise, this scenario is when the requesting electronic device 10 is just outside the protected entity service contour of the radio device 80 where the noise contributions from the radio device 80 are likely to be the highest.

Table 1 shows the contour field strength values at the protected contour for television stations as established by the FCC.

TABLE 1

| Type of TV Station | Channel | Protected Contour | |
| --- | --- | --- | --- |
| | | Contour (dBu) | Propagation Curve |
| Analog: Class A TV, LPTV, translator and booster | Low VHF (2-6) | 47 | F(50, 50) |
| | High VHF (7-13) | 56 | F(50, 50) |
| | UHF (14-69) | 64 | F(50, 50) |
| Digital: Full service TV, Class A TV, LPTV, translator and booster | Low VHF (2-6) | 28 | F(50, 90) |
| | High VHF (7-13) | 36 | F(50, 90) |
| | UHF (14-69) | 41 | F(50, 90) |

According to table 1, the highest amount of in-band noise from a digital television station that an electronic device 10 may expect to experience is 41 dbuV/m, which is equal to −74.8 $dbm/m^2$. When adjusted by the effective area of a typical receive antenna with 7.5 dbi of gain (effective area 0.18 $m^2$) where 10*log (1 meter/0.18 meters) equals 7.4 db, this yields a received noise power of −82.2 dbm, which is a very noisy environment.

The out-of-band emissions generated by a high-power station are considered next. Using empirically-derived field data, it has been determined that the out-of-band noise generated by a TV station in adjacent 6 MHz channels can be as follows: about 45 db less than the in-band signal strength in immediately adjacent channels (n±1), about 50 db less than the in-band signal strength two channels above and below (n±2), about 55 db less than the in-band signal strength three channels above and below (n±3), and about 60 db four less than the in-band signal strength channels above and below (n±4).

For the worst case scenario, the out-of band emissions typically are caused by stations having a protected region in which the electronic device 10 is located. The in-band signal strength of these stations at the location of the electronic device 10 may be as high as 100 dbuV/m since the electronic device 10 is within the protected entity service contour. Therefore, an available (un-protected) white space channel +/−2 channels from a protected channel can yield a noise floor as high as 50 dbuV/m (−65.8 dbm), yielding a received noise power of −73.8 dbm (for a 7.5 dbi antenna). This amount of noise effectively renders these channels inoperative for wireless communication by the electronic device 10. These channels may be considered "grey space" rather than white space.

D(ii). Second Prophetic Example

In this example, the requesting electronic device 10 is located in a location where channels 1, 2, 5, and 6 are available. At this location, two televisions stations, referred to as TV1 and TV2, respectively operate on channels 3 and 4 and are within the threshold distance for consideration as noise contributors to the requesting electronic device 10. Sensing data is available at this location for channel 6. At the time of the request, the sensed field strength value is 17.8 dBuV/m.

In accordance with the foregoing process flow, TV1 (primary channel 3) and TV2 (primary channel 4) are added to the StationList. For purposes of this example, it will be assumed that the determined in-band field signal strength level for TV1 is 95 dBuV/m. Each TV station emission uses a filter to restrict emissions in adjacent channels, but emissions are still present in adjacent channels. For purposes of the example, a mask is applied where out-of-band emissions are determined to be 45 db less than the in-band signal strength in immediately adjacent channels (n±1) and 50 db less than the in-band signal strength two channels above and below (n±2). Under these assumptions the out-of-band field strengths due to TV1 for channels 2 and 4 (n±1) are each 50 dBuV/m (95 dBuV/m minus 45 dBuV/m) and the out-of-band field strengths due to TV1 for channels 1 and 5 (n±2) are each 45 dBuV/m (95 dBuV/m minus 50 dBuV/m). The field strength values for TV1 are stored in the Hashtable under the appropriate channel indices.

Similar field strength determinations are made for TV2, which operates on channel 4. For purposes of this example, it will be assumed that the determined in-band field signal strength level for TV2 is 90 dBuV/m. Using the same out-of-band calculation assumptions that were used for TV1, the out-of-band field strengths due to TV2 for channels 3 and 5 (n±1) are each 45 dBuV/m (90 dBuV/m minus 45 dBuV/m) and the out-of-band field strengths due to TV2 for channels 2 and 6 (n±2) are each 40 dBuV/m (90 dBuV/m minus 50 dBuV/m). The field strength values for TV2 are stored in the Hashtable under the appropriate channel indices.

The sensing data for the location of the requesting electronic device 10 (17.8 dBuV/m (6 MHz) in channel 6) is also stored in the Hashtable under the index for channel 6. Table 2 represents an exemplary Hashtable for the values described in this example.

TABLE 2

| Index | Contributor 1 (TV1) | Contributor 2 (TV2) | Sensing Data |
|---|---|---|---|
| Channel 1 | 45 | — | — |
| Channel 2 | 50 | 40 | — |
| Channel 3 | 95 | 45 | — |
| Channel 4 | 50 | 90 | — |
| Channel 5 | 45 | 45 | — |
| Channel 6 | — | 40 | 17.8 |

Table 3 shows the Hashtable of table 2 with the values converted to dBm/m$^2$ and the sum of the values for each index.

TABLE 3

| Index | Contributor 1 (TV1) | Contributor 2 (TV2) | Sensing Data | Sum |
|---|---|---|---|---|
| Channel 1 | −70.8 | — | — | −70.8 |
| Channel 2 | −65.8 | −75.8 | — | −65.3 |
| Channel 3 | −20.8 | −70.8 | — | −20.7 |
| Channel 4 | −65.8 | −25.8 | — | −25.7 |
| Channel 5 | −70.8 | −70.8 | — | −67.8 |
| Channel 6 | — | −75.8 | −98 | −75.7 |

D(iii). Alternatives

There are a total 50 channels in TV white space. There are about 8,000 broadcast television stations in the U.S. Processing and recording field strength values for each of the channels can become processor intensive when there are a relatively large number of noise contributors to consider. To reduce processing while minimizing sacrifices in performance, the contributors considered by the server 12 may be limited to high-powered devices 80 that operate on channels that are available (un-protected) at the location of the requested electronic device 10 and high-powered devices 80 that operate on channels adjacent to the channels that are available (un-protected) at the location of the requested electronic device 10 by one channel increment (n±1) and by two channel increments (n±2) (or another predetermined number of channel increments from the available channel). Under this adjustment, the Hashtable need only contain computed field strength values and sensing data for available channels. For example, if only channel 4 and 6 are available at the requesting device's location, then only those high-power transmitters operating on the available channels 4 and 6 and the channels within the predetermined number of adjacent channels above and below the available channels are considered in the field strength level computations. Any other high-power transmitters may be ignored. If the predetermined number of adjacent channels above and below the available channels is two, then under the example where the available channels are channels 4 and 6 the channels adjacent channel 4 within two channel increments are channels 2, 3, 5, and 6. Similarly, the channels adjacent channel 6 are 4, 5, 7, and 8. As a result, the channels to be processed include the subset of channels 2, 3, 4, 5, 6, 7, and 8, and processing of transmitters not broadcasting on those channels may be ignored.

An additional or alternative change to reduce processing is to ignore transmitters that do not have a significant effect on the noise floor level of the transmitter's primary channel and adjacent channels. As an example, assume that there are 200 TV stations within a radius defined by the predetermined distance. Typically, not all of these stations will transmit at a high-power level given their distance from the location of the requesting electronic device to have a significant effect on the primary channel of the transmitter and the adjacent channels. Such stations may be eliminated from consideration. In one embodiment, the transmitters that are ignored are those transmitters that have a computed field strength at their primary channel that is less than a predetermined threshold field strength threshold, regardless of the distance between the transmitter and the requesting electronic device. In another embodiment, if transmit power at a predetermined distance from the location of the requesting electronic device falls below a predetermined field strength threshold, then this station is eliminated from consideration.

E. Conclusion

Although certain embodiments have been shown and described, it is understood that equivalents and modifications falling within the scope of the appended claims will occur to others who are skilled in the art upon the reading and understanding of this specification.

What is claimed is:

1. An electronic device, comprising:
communications circuitry configured to communicate with an assistance server and comprising an antenna assembly having antenna configuration parameters including a gain profile and a direction; and
a controller configured to transmit a noise floor data request to the assistance server, the noise floor data request including a location of the electronic device, an indication of the gain profile and the direction, and the controller further configured to receive a noise floor value from the assistance server for at least one wireless communications channel, the noise floor value determined to account for the location of the electronic device, the gain profile and the direction of the antenna assembly.

2. The electronic device of claim 1, wherein in response to the noise floor data request, the electronic device receives from the assistance server a list of possible operating channels and for each possible operating channel a noise floor value determined to account for the location of the electronic device, and the gain profile and direction of the antenna assembly.

3. The electronic device of claim 1, wherein the gain profile is a selected one of plural gain profiles stored in an antenna library, each of the plural gain profiles having a corresponding antenna configuration value, and the antenna configuration value for the selected one of the plural gain profiles being the indication of the gain profile transmitted to the assistance server in the noise floor data request for the assistance server to use to determine the gain profile from a database stored by the assistance server.

4. The electronic device of claim 1, wherein the gain profile is a custom gain profile and the gain profile is transmitted to the assistance server as the indication of the gain profile.

5. The electronic device of claim 1, wherein the electronic device engages in wireless communications with the communications circuitry and the controller is further configured to make at least one of a channel selection for the wireless communications or a gain profile selection for the antenna assembly using the noise floor value received from the assistance server to optimize wireless communications performance.

6. The electronic device of claim 5, wherein the electronic device transmits the noise floor data request and makes the channel selection or the gain profile selection as background operations without involvement of a user.

7. The electronic device of claim 1, wherein the noise floor data request is part of a channel list request and the assistance server returns a channel list of channels available for use by the electronic device and, for each available channel, a predicted noise floor amount caused by high-power protected transmitters, wherein interference from primary channel and out-of-band emissions of the transmitters is considered to determine the predicted noise floor amounts.

8. The electronic device of claim 1, wherein the antenna configuration parameters include a specified channel and the received noise floor value is a predicted noise floor amount for the specified channel caused by high-power protected transmitters, wherein interference from primary channel and out-of-band emissions of the high-power protected transmitters is considered to determine the predicted noise floor amount.

9. A method of assessing wireless communication channel quality for an electronic device having an antenna assembly having antenna configuration parameters including a gain profile and a direction, comprising:
transmitting a noise floor data request to an assistance server, the noise floor data request including a location of the electronic device, an indication of the gain profile and the direction; and
receiving, in response to the noise floor data request, a noise floor value from the assistance server for at least one wireless communications channel, the noise floor value determined to account for the location of the electronic device, the gain profile and the direction of the antenna assembly.

10. The method of claim 9, wherein in response to the noise floor data request, receiving from the assistance server a list of possible operating channels and for each possible operating channel a noise floor value determined to account for the location of the electronic device, and the gain profile and direction of the antenna assembly.

11. The method of claim 9, further comprising selecting the gain profile from plural gain profiles stored in an antenna library, each of the plural gain profiles having a corresponding antenna configuration value, and the antenna configuration value for the selected one of the plural gain profiles being the indication of the gain profile transmitted to the assistance server in the noise floor data request for the assistance server to use to determine the gain profile from a database stored by the assistance server.

12. The method of claim 9, wherein the gain profile is a custom gain profile and the gain profile is transmitted to the assistance server as the indication of the gain profile.

13. The method of claim 9, wherein the electronic device engages in wireless communications and the method further comprises selecting a channel for the wireless communications or a gain profile for the antenna assembly using the noise floor value received from the assistance server to optimize wireless communications performance.

14. The method of claim 13, wherein transmission of the noise floor data request and selection of the channel or the gain profile are carried out as background operations without involvement of a user.

15. The method of claim 9, wherein the noise floor data request is part of a channel list request and the assistance server returns a channel list of channels available for use by the electronic device and, for each available channel, a predicted noise floor amount caused by high-power protected transmitters, wherein interference from primary channel and out-of-band emissions of the transmitters is considered to determine the predicted noise floor amounts.

16. The method of claim 9, wherein the antenna configuration parameters include a specified channel and the received noise floor value is a predicted noise floor amount for the specified channel caused by high-power protected transmitters, wherein interference from primary channel and out-of-band emissions of the high-power protected transmitters is considered to determine the predicted noise floor amount.

17. A network planning tool, comprising:
a communication interface over which communication with an assistance server is established;
a controller configured to transmit a noise floor data request to the assistance server, the noise floor data request including a potential location of a radio device and potential antenna configuration parameters for the radio device including an indication of a gain profile and an antenna direction, the radio device being a separate electronic device from the network planning tool, and the controller further configured to receive from the assistance server, in response to the noise floor data request, a noise floor value for at least on wireless communication channel, the noise floor value determined to account for the location and antenna configuration parameters.

18. The network planning tool of claim 17, wherein the controller is further configured to select, in consideration of the noise floor value, at least one of a location, an operational channel, a gain profile, or an antenna assembly direction for the separate radio device.

* * * * *